May 29, 1945. J. NICHOLAS 2,377,028
COOLING SYSTEM AND THERMOSTATICALLY CONTROLLED BY-PASS VALVE
Filed Oct. 29, 1943
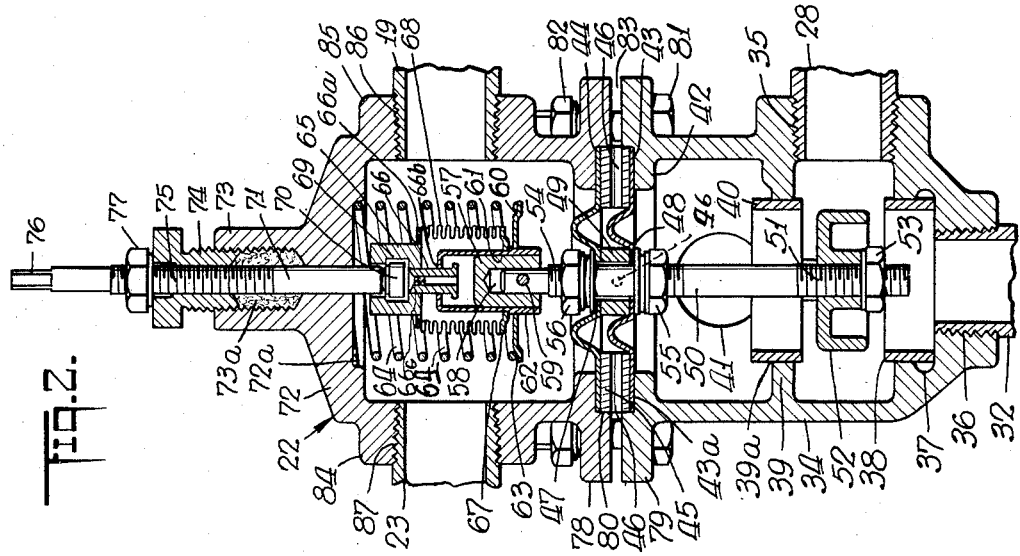
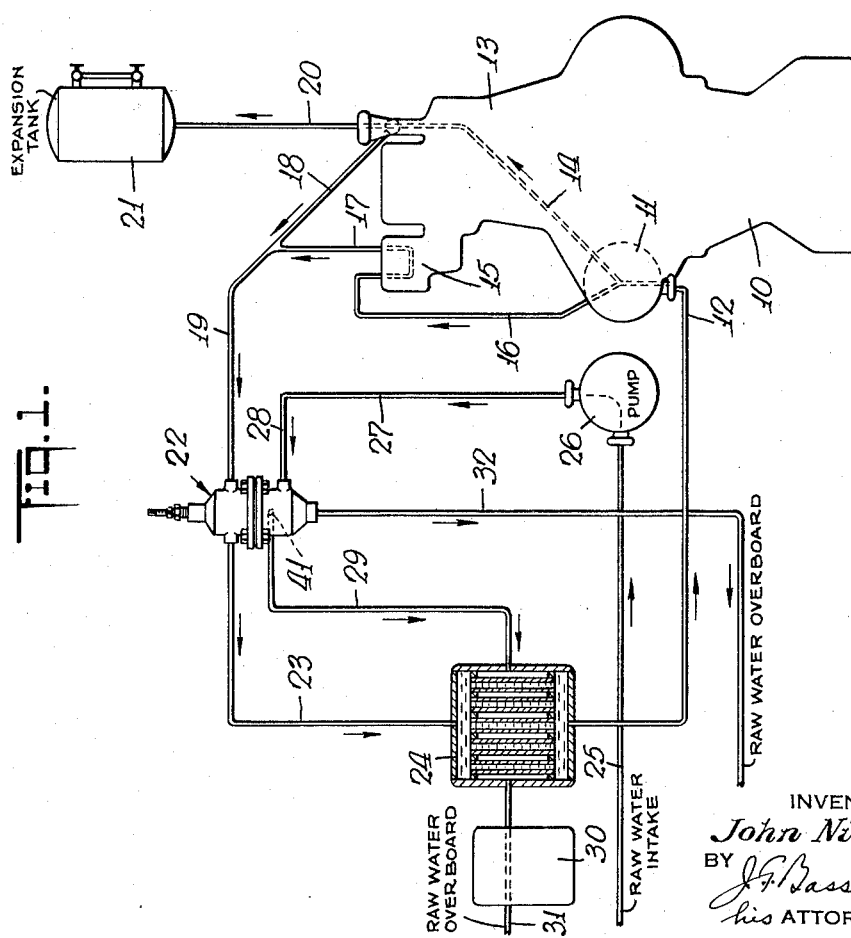
INVENTOR
*John Nicholas*
BY
*J.F. Basseches*
*his* ATTORNEY
43-204

Patented May 29, 1945

2,377,028

UNITED STATES PATENT OFFICE 2,377,028

COOLING SYSTEM AND THERMOSTATICALLY CONTROLLED BY-PASS VALVE

John Nicholas, Middle Village, N. Y., assignor, by mesne assignments, to John Reiner & Company, Long Island City, N. Y., a limited partnership Application October 29, 1943, Serial No. 508,182

11 Claims. (Cl. 123—178)

This invention relates to cooling systems for internal combustion engines; more particularly, to cooling systems for marine engines, and thermostatically controlled by-pass valves for said systems.

Known to me in connection with internal combustion engines, such as Diesel engines and other marine engines, is the provision of a water circulating system to cool the engine, and the provision of a heat exchanger in the nature of a radiator through which raw water or sea water circulates to cool the less abundant and less corrosive fresh water which is circulated through the engine cooling jacket or manifold. These cooling systems which include a fresh water circulating line, and a raw or sea water circulating line are interconnected so that the heat exchanger cooled by the raw water or sea water has a constant flow; whereas the fresh water cooling medium upon which the first mentioned system acts is thermostatically controlled to qualify the character of fresh water circulation of the engine and cooling system in accordance with service requirements.

Systems of this character have many deficiencies among which are failures caused by the deleterious and corrosive effect of the raw water circulating medium of the secondary cooling system in which is circulated the raw water. The raw water in the secondary cooling system which passes through the heat exchanger, and the oil cooling system and the thermostatic element without regard to service requirements erodes or clogs up these elements requiring frequent servicing for repair, cleaning and replacement.

In accordance with the object of my invention, I provide in combination with the cooling system of an internal combustion engine, more particularly marine engines, a primary cooling system for the water jacketed parts of the engine, in which the fresh water or non-corrosive cooling media of limited supply is circulated and employ raw or sea water in a secondary circulating system to circulate through a heat exchanger for cooling the medium of the primary system in accordance with the service requirements of the primary cooling system without excessive circulation above working requirements of the raw water or corrosive sea water; more particularly, it is an object of my invention to provide in combination with the primary cooling system of a marine engine, using fresh or non-corrosive cooling media of limited character, and having a heat exchanger, the provision of a circulating system of a raw or corrosive water which is circulated in a secondary circulating system and through the heat exchanger, in accordance with service requirements, as determined thermostatically, and, to by-pass in accordance with service requirements excessively and plentifully available raw or sea water so as to limit the circulation of this raw medium rather than excessively, through delicate parts, such as the heat exchanger and thermostatic element completely to isolate the primary cooling system from the fluid of the secondary cooling system when service requirements do not require the undue cooling effect of the medium in the secondary cooling system.

Still, more particularly, it is an object of my invention to provide in the cooling system of internal combustion engines, more particularly, marine engines employing a primary cooling system using fresh water or like media, having a secondary cooling system for the latter which employs raw water, of means to control the circulation of raw water passing through controls, such valves, heat exchangers, to by-pass the more or less corrosive raw water circulating medium by temperature conditions predeterminedly desired in the primary cooling system, and to apportion the flow of the cooling medium in the secondary system, the by-passing instruments being effective to assure long, continued life of inexpensive mechanism which is common to the primary and secondary cooling media.

Still further objects of my invention reside in the provision, in combination with a cooling system for internal combustion engines, of a thermostatically controlled by-pass valve which limits the circulation of raw water through the secondary cooling system employing raw water, and which apportions the flow of the raw water circulating medium in accordance with service requirements without the employment of stuffing boxes acting between a thermostatic element and which serves to apportion the flow of the cooling medium in the secondary system in accordance with the requirements for heat exchangers in the primary cooling system.

Still further objects of my invention reside in the provision of a thermostatically controlled bypass assembly controlled by the temperature requirements of the primary circulating system characterized by valve actuating mechanism which is isolated from a thermostatic element, and further characterized by actuation of the valving mechanism of the secondary cooling system, whereupon failure due to wear or other breakdown of the actuating mechanism, the circulating medium of both the primary system and secondary system will remain isolated.

Still further objects of my invention reside in the provision of a thermostatically controlled raw water by-pass type valve for marine engines employing a primary cooling system, and a secondary cooling system characterized by compactness of the arrangement of parts to perform the intended purposes of apportioning of the ratio of water to be by-passed in the secondary cooling system to predeterminedly cool the medium of the primary system in accordance with the service requirements, and assure long life and maintenance of critical control mechanism of the cooling systems.

To attain the foregoing objects, and such further objects as may appear herein, or did hereinafter point out, I make reference to the accompanying drawing forming a part hereof in which:

Figure 1 is a diagrammatic illustration of my cooling system.

Figure 2 is a longitudinal sectional view through the thermostatically controlled by-pass valve control assembly.

Making reference to the drawing the diagrammatic illustration shows an engine block 10 having a fresh water pump 11, supplied by the intake line 12, feeding fresh water to the jacket 13 by the line 14, and feeding water to the manifold 15, by the line 16 also connected with the pump 11. The fluid circulated through the jacket and manifold merge through the lines 17 and 18 in the outlet line 19. The line 20 is common to the jacket line 14 terminating in the expansion tank 21. The outlet line 19 passes through a thermostatic assembly casing 22, as will be described in greater detail hereafter, and then by means of the conduit 23, the fresh water is conducted through the heat exchanger 24, and returns by the intake line 12 to the pump 11 to complete the cycle of circulation. This circulating system will be referred to as the primary circulating system and employs fresh water or none too plentifully available circulatory media of non-corrosive character which economy and storage space dictate be used sparingly or be not wastefully used.

The secondary circulating system has as its source of supply raw water or sea water which is drawn in from overboard by the raw water intake pipe 25 through the pump 26 and is fed by the pipe or line 27 to the inlet 28 in the casing of the thermostatic assembly 22, the details of which will be described in connection with Figure 2. From the casing 22 the raw water passes by the pipe 29 to the cooling jacket heat exchanger 24, the details of which are not shown because this is standard equipment, and then may pass through an oil cooler 30 before it passes overboard through the pipe 31. An optional by-passing path from the casing 22 of the raw water fed from the pipe 27 is through the by-passed pipe 32 and thence outwardly to be discharged overboard.

The optional path of the raw water through the pipe 29 or by-passed through the pipe 32 or apportioned in accordance with service requirements, in part through the pipe 29, and in part through the pipe 32, is accomplished by the mechanism in the thermostatic casing 22 which will now be described.

The casing 22 comprises a lower raw water housing 34 which has threaded inlet flange connection 35 forming the inlet 28 to which the raw water feed line 27 is arranged to be connected. A by-pass outlet flange 36 is threaded and arranged to be connected to the by-pass pipe 32 previously described. Within the casing there is provided above the orifice 36 a seat 37 upon which there is mounted a generally cylindrical valve liner 38. Above the inlet 35 is a partition 39 which partitions the casing into two parts and is provided with an axial orifice 39a forming a seat. Upon the seat 39a a generally cylindrical valve liner 40 is positioned. Above the partition 39 within the casing 34 there is provided an outlet orifice 41. This is suitably threaded to receive the conduit 29 in the raw water circulating system previously mentioned. The casing at its upper portion is provided with an inwardly directed flange 42 having at its upper face a chamfered portion 43a. On the chamfered seat thus provided there is positioned a pair of diaphragms 43 and 44, sandwiching between these diaphragms a center ring 45. This ring is formed with radially directed borings 46. Four or more of these radial borings are provided for reasons which will appear more clearly as this description proceeds and therefore leave the space between the diaphragms open to the atmosphere.

Each of the diaphragms 43 and 44 are formed with axial orifices 47 and 48. A diaphragm spacer 49 is positioned axially between the upper diaphragm 44 and the lower diaphragm 43. With the assembly thus provided, a valve stem 50 is directed through the orifices 47, 48 and the spacer 49.

The valve stem described is threaded at its lower portion 51 and there carries a valve 52 being held in position by the jamb nut 53. The valve stem 50 is also threaded adjacent its upper portion 54 and carries spaced nuts 55 and 56 to clamp the diaphragms 43 and 44 against the spacer 49 in sealed relationship about the stem 50.

Over the end of the spindle there is positioned a stud 57 by interfitting the boring thereof 58 with the spindle just described. A cotter pin 59 passes through the spindle and stud to hold the stud and spindle locked to each other. Over the stud 57 there is positioned a bellows head 60 in the form of a deep cup shaped member whose mouth 61 snugly engages the stud 57 up to the shoulder 62, acting as a limiting stop, leaving the flange 63 upon which one end of the compression spring 64 is mounted. The bellows head 60 has mounted on it a stem head 65 by providing a tubular neck portion 66 which enters the base of the bellows head through a generally oval orifice 66b so as to have the stem head 65 non-rotatable but in slidable relation to the bellows head 60 previously mentioned. The lower portion of the stem head 65 is formed with a flange 66a. Over the cup shaped portion of the bellows head 60 there is positioned the shield 67. This shield cooperates with the flange 66a to hold externally sealed there between the bellows 68. The internal seal of the bellows is accomplished by the engagement of the mouth 61 over the stud 57 at one end and by the neck 66 fitting in the orifice 66b at the other end. After adjustment of the bellows 68 with the proper medium, such as alcohol or the like, the tubular neck 66 is sealed with solder 66c. This assembly provides a thermostatic element which is illustrative only, it being understood that other thermostatic means may be employed.

The stem head 65 is axially formed with a bearing 69 to receive the headed portion 70 formed on the set screw stem 71 which is carried by the fresh water housing section 72. The bearing portion 69 is formed with a lateral opening (not shown) to permit lateral insertion of the headed portion 10 of the set screw stem 71 in longitudinal locking position while still permitting rotation of the set screw stem 71 in a manner which will be readily understood. The set screw stem 71 passes through the collar 73 within which boring packing 73a is provided and over which is formed a packing nut 74 holding the set screw stem 71 sealed in rotatable relationship to the casing 72. The upper portion 75 of the set screw stem 71 is screw threaded in relation to the packing nut 74 thereby permitting the stem to be rotated by some wrench or keying device at its head 76 for adjustment longitudinally. A locking nut 77 is availed of to hold the set screw stem 71 in fixed relationship to the packing nut 74.

The fresh water housing section 72 is formed at its lower edge with a flange 78 cooperating with a complementary flange 79 on the raw water housing section 34, previously mentioned. A chamfered section 80 is formed adjacent the base of the fresh water housing section 72 to receive the upper edge of the spacing ring 45 and the diaphragm 44 previously described. The bolt 81 and nut 82 passing through the flanges 78 and 79, seals the fresh water housing section 72 to the raw water housing section 34 and provides the necessary pressure for the spring 64 acting on one end against the flange 63 previously mentioned, and against the seat 72a on the head of the fresh water section. Thus pressure is provided to opposite sides of the diaphragms 43 and 44, leaving a spaced opening or gap 83 in alignment with the radially directed borings 46 formed in the spacer ring 45.

The fresh water housing section is formed with bosses 84 and 85 through which threaded openings 86 and 87 are provided. The opening 86 is arranged to be connected to the line 19. The opening 87 is arranged to be connected to the line 23, both of which form part of the primary cooling system.

The operation of the thermostatic assembly just described will be clear from the above assembly of parts. As the cooling medium, such as fresh water circulates through the primary cooling system it will enter the fresh water housing section 72 through the opening 86 and pass over the thermostatic bellows 68 and then outwardly through the opening 87, to the line 23 as part of the circulation through the heat exchanger 24 by means of the pump 11. Fluctuations in temperature are transmitted through the head 60 to the valve stem 50 as the medium within the bellows 68 expands or contracts. The diaphragms 43 and 44 serve as flexible guiding and sealing medium during movement imparted to the valve stem 50.

The valve 52 may move upwardy, completely to seat upon the valve liner 40, in which event raw water entering through the inlet opening 35 is by-passed through the opening 36 and then after passing through the line 32 is discharged overboard.

As the temperature in the primary circulating system increases, the valve 52 is directed by the thermostatic element towards the valve liner 38 connecting the orifice 41 with the inlet 35 and permitting raw water to circulate through the orifice 41, thence through the heat exchanger 24 by the line 29 to direct more raw water through the heat exchanger and the secondary cooling system and in turn cool the water of the primary cooling system. The valve 52 may, more or less, be said to float between the valve liner 40 and the valve liner 38 in various degrees to apportion the flow of raw water in the secondary cooling system, in part to by-pass the raw water, and in part to pump water through the secondary cooling system and into the cooling section of the heat exchanger 24.

By the construction shown and described, the fresh water housing section is completely isolated from the raw water housing 34. Actuation of the valve by the thermostatic element 68 is through the medium of the diaphragms 43 and 44, avoiding stuffing boxes and therefore completely sealing these sections from each other. These diaphragms are desirably made of synthetic rubber such as "Buna" and formed with a concentric ridge to assure greater flexibility.

The spring 64 is chosen in accordance with the tension qualities of the bellows 68 in its adjusted position to cooperate with the same in movement of the valve stem 50.

Should there be failure in the raw water system, discharge of the raw water is effected through the radial borings 46 and then outwardly through the gap 83. Should there be failure in the thermostatic element 68, the spring pressure of the spring member 64 and the normal expansion force of the bellows 68 in the unsealed condition, will seat the valve 52 upon the liner 38 to send all the raw water entering through the orifice 35 through the outlet 41 into the heat exchanger by the pipe 29.

The effect of leakage which may occur between the diaphragms 43 and 44 is harmless since the construction prevents the mixing of the more or less corrosive raw water with the fresh water, since such water will pass out through the borings 46 and through the gap 83. The borings 46 likewise being open to each outer side of the diaphragm, avoids antagonistic forces to be created between the medium circulating in the primary cooling system and the secondary cooling system.

Operation of the thermostatic element completely in the fresh water or primary cooling system assures long life, not only of this rather expensive instrument, but the other parts of the mechanism through which the raw water would ordinarily flow. Thus it will be seen that the fresh water in the primary system, while being made to circulate to the maximum extent, places the burden of circulating the raw water and more or less corrosive cooling medium of the secondary cooling system, to the minimum.

Wide range of adjustment is possible by the connection between the bellows head and adjusting screw to apportion the ratio of raw water by-passed and sent through the secondary cooling system with a fine degree of adjustment.

It will thus be observed that I have provided a cooling system which may economically and efficiently employ fresh water or like non-corrosive or not readily available cooling media in the internal combustion engines for marine purposes, whereby a more or less constant water jacket temperature may be maintained. It will also be observed that by the construction illustrated and described, direct actuation of the by-passing valve is secured as adjusting conditions may require.

It will further be observed that I have provided a thermostatic by-pass valve assembly which is exceedingly compact, minimizing requirements for its repair and simplifying servicing operations. By complete isolation of the fresh water housing section from the raw water section and placing reliance upon the thermostatic element to divert or apportion the raw water, minimum wear and tear is involved upon the more delicate instrumentalities.

Thus it will be observed that I have provided a highly efficient cooling system and thermostatic control for the same.

Having thus described my invention and illustrated its use, what I claim as new and desire to secure by Letters Patent is:

1. In an internal combustion engine having cooling jackets surrounding the engine parts to be cooled, the combination therewith of a primary circulating cooling system for circulating substantially constantly a non-corrosive cooling medium through said jackets, a secondary circulating system and means connecting the same to raw water supply for circulating raw water through the same and only in heat exchange relationship to said cooling medium of said primary cooling system, a by-pass line for said secondary system including valving means to divert said raw water from the secondary cooling system to said by-pass line and discharge said raw water prior to effecting the heat exchange relationship mentioned, and means in isolated relationship from said secondary circulating system controlled by the temperature of the circulating medium of said primary system for controlling the quantity of flow of raw water diverted to said by-pass line.

2. In an internal combustion engine having cooling jackets surrounding the engine parts to be cooled, the combination therewith of a primary circulating system for circulating in a substantially closed cycle fresh water, as the cooling medium through said jackets, a secondary circulating system and means connecting the same to raw water for circulating raw water through the secondary system and in heat exchange relationship to the cooling medium of said primary cooling system, means for diverting raw water from circulating in the said heat exchange relationship comprising a by-pass valve controlled line, discharging the raw water from said secondary cooling system and thermo-responsive means isolated from said secondary system but controlled by the temperature of the circulating fresh water of said primary system for controlling the by-pass valve and apportion the flow of raw water diverted to said by-pass line and said secondary cooling system.

3. In an internal combustion engine having cooling jackets surrounding the engine parts to be cooled, the combination therewith of a primary circulating system for circulating fresh water as a non-corrosive cooling medium through said jackets, means to effect in substantially closed cycle relationship the flow of fresh water circulating in the primary system, a secondary circulatory system and means connecting the same to a raw water source of supply, means for circulating said raw water through the secondary system and directing the same through a heat exchanger with which said primary cooling system is connected in heat exchange relationship, a by-pass line for said secondary system including means to divert said raw water from the heat exchanger and to by-pass said raw water to discharge the same from said system, and means isolated from said secondary circulating system controlled by the temperature of the fresh water of said primary system for controlling the amount of flow of the raw water diverted to said by-pass line and to said heat exchanger.

4. In an internal combustion engine having cooling jackets surrounding the engine parts to be cooled, the combination therewith of a primary cooling system wherein fresh water is circulated in substantially closed cycle circulation, a secondary circulating system, means for circulating raw water through said secondary system, a heat exchanger through which both circulating systems are connected in heat exchange relationship, a by-pass line for said secondary system including valving means to divert raw water from said heat exchanger, thermostatic means isolated from said secondary system for operating the valving means and controlled by the temperature of the circulating medium of said primary cooling system for apportioning the flow of raw water to said by-pass line and heat exchanger in accordance with the service requirements determined by said thermostatic means of said primary cooling system.

5. A by-pass valve assembly for an internal combustion engine having a primary circulating system employing fresh water as a cooling medium and including a secondary circulating system employing raw water as the circulating medium, the combination comprising a fresh water housing section having inlet and outlet ports through which said fresh water passes, a raw water housing section having an inlet port, a main outlet port and a by-passing outlet port, a thermostatic element in said first housing actuating a valve which optionally may connect either outlet port with said inlet port in said second section through a stem connecting said thermostatic element with said valve, diaphragms sealing said sections serving as guides for said stem.

6. A by-pass valve assembly with an internal combustion engine having a primary circulating system and a secondary circulating system, the combination comprising a housing section having inlet and outlet ports for connection in said primary circulating system, a second housing section having an inlet port and a main outlet port for connection in said secondary circulating system, said second section having a by-passing outlet port, a thermostatic element in said first housing section actuating a valve in said second section by a valve stem which may apportion the circulating medium of said secondary system coming through said inlet port, to flow in whole through said main outlet port or in whole or in part through said main outlet port and by-passing outlet port, a flexible diaphragm sealing said sections from each other, the valve actuated by said thermostatic element serving optionally to connect said inlet port of said second housing with said outlet port and by-passing port, said valve so actuated by said thermostatic element being through said diaphragm which acts as a guide for said stem.

7. A by-pass valve assembly for an internal combustion engine having a primary circulating system and a secondary circulating system, the combination comprising a first housing section having inlet and outlet ports for connection with said primary circulating system, a second housing section connected to said first section having an inlet port, a main outlet port and a by-passing outlet port, a thermostatic element in said first housing section actuating a valve which optionally may connect either of said outlet ports with said inlet port of said second housing, a flexible diaphragm sealing said sections from each other, a stem connecting said valve with said thermostatic element having a guiding connection with said diaphragm.

8. A by-pass valve assembly for an internal combustion engine having a primary circulating system and a secondary circulating system, the combination comprising a first housing section having inlet and outlet ports for connection with said primary circulating system, a second housing section connected to said first section having an inlet port, a main outlet port and a by-passing outlet port, a thermostatic element in said first housing section actuating a valve which optionally may connect either of said outlet ports with said inlet port of said second housing, a flexible diaphragm sealing said sections from each other, a stem connecting said valve with said thermostatic element having a guiding connection with said diaphragm and a set screw connected with said thermostatic element in said first section for positioning the valve through the medium of said thermostatic element to apportion the circulating medium through said outlets of said second housing section.

9. A by-passing valve assembly for an internal combustion engine having a primary circulating system and a secondary circulating system each of which include different cooling media, the combination comprising a first housing section having inlet and outlet ports respectively connected to the primary circulating system, a second housing section having an inlet port, a main outlet port, means for connecting said sections with each other, diaphragms sealing said sections and clamping therebetween a spacer ring having outlets open to the atmosphere, a thermostatic element in said first housing section actuating a valve which optionally may connect either of said outlet ports with said inlet port in said second section through a stem connecting said thermostatic element with said valve, said stem having a sealing connection axially through said diaphragms.

10. A by-passing valve assembly for an internal combustion engine having a primary circulating cooling system employing fresh water as a cooling medium and including a secondary cooling circulating system employing raw water as the circulating medium, the combination comprising a fresh water housing section having inlet and outlet ports through which said fresh water medium passes, a raw water housing section having an inlet port, a main outlet port and a by-passing outlet port, means for connecting said sections to each other, spaced flexible diaphragms interposed between said means for connecting said ports to each other, a spacing ring and spacer sandwiched between said diaphragms holding said diaphragms spaced from each other and forming a gap between said housings, said spacing ring having borings open to the atmosphere through said gap, a thermostatic element in said first section, a valve which optionally may permit connection of either of said outlet ports with said inlet ports in said second housing section or apportion the circulating medium through said second housing section in part through said outlet port and in part through said by-passing port, said valve being actuated by said thermostatic element through the flexible connection provided by said diaphragms.

11. A by-passing valve assembly for an internal combustion engine having a primary circulating cooling system employing a non-corrosive cooling medium and including a secondary cooling system employing raw water as the circulating medium, the combination comprising a first housing section for said primary system having inlet and outlet ports, a second housing section having an inlet port, an outlet port and a by-passing outlet port, means connecting said sections to each other and sealing means therebetween, a valve in said second housing section for optionally connecting said inlet port with said outlet and by-passing ports and means connecting said thermostatic element with said valve operating through said sealing means between said sections, means for adjusting said thermostatic element in predetermined positions including mounting means whereupon failure of said thermostatic element the valve will be moved to close the by-passing port.

JOHN NICHOLAS.